United States Patent [19]
Kowalewski

[11] 3,764,729
[45] Oct. 9, 1973

[54] RELEASABLE LOCK SUPPORT FOR PRINTED CIRCUIT MODULE
[75] Inventor: Edward C. Kowalewski, Palatine, Ill.
[73] Assignee: Admiral Corporation, Chicago, Ill.
[22] Filed: Nov. 29, 1971
[21] Appl. No.: 202,946

[52] U.S. Cl............ 174/138 D, 24/73 P, 24/221 R, 85/5 R
[51] Int. Cl....................... F16b 19/00, A44b 21/00
[58] Field of Search .................. 174/40 CC, 138 D, 174/158 R, 164; 24/73 R, 73 AP, 73 PM, 73 PF, 73 P, 73 HS, 208 A, 221 R; 85/5 R, 5 P, DIG. 2; 248/71, 73, 223; 317/101 R, 101 CM, 101 D, 101 DH

[56] References Cited
UNITED STATES PATENTS

| | | | |
|---|---|---|---|
| 3,029,486 | 4/1962 | Raymond | 174/138 D UX |
| 3,651,545 | 3/1972 | Hara | 174/138 D UX |
| 3,688,635 | 9/1972 | Fegen | 174/138 D UX |
| 1,268,466 | 6/1918 | Hunter | 174/158 F UX |
| 2,260,048 | 10/1941 | Newell | 174/138 D X |
| 2,442,754 | 6/1948 | Beam | 174/138 D UX |
| 3,066,367 | 12/1962 | Garman | 174/158 R UX |
| 3,154,281 | 10/1964 | Frank | 174/40 CC UX |
| 3,568,263 | 3/1971 | Meehan | 24/73 P |
| 3,577,603 | 5/1971 | Heath et al. | 24/73 P |

FOREIGN PATENTS OR APPLICATIONS

| | | | |
|---|---|---|---|
| 972,995 | 10/1964 | Great Britain | 85/5 R |
| 1,066,054 | 9/1959 | Germany | 24/73 HS |
| 890,484 | 2/1962 | Great Britain | 174/138 D |

Primary Examiner—Laramie E. Askin
Attorney—Carlton Hill et al.

[57] ABSTRACT

A releasable lock support is provided for releasably locking together two components such as a printed circuit board and a chassis. The lock support has a pair of dished flexible flange members which are urged into engagement with the two members to be releasably locked together, and act as spring washers against their respective members. The lock support extends through aligned apertures formed in the members to be joined, and includes a pair of flexible leg members which cooperate with one of the dished flange members to engage the chassis firmly, while the other dished flange member cooperates with a gripping means to firmly seat the flange member against the other member. In the preferred embodiment of the invention, the lock support is a one piece element molded from a suitable insulator material.

2 Claims, 6 Drawing Figures

PATENTED OCT 9 1973 3,764,729

RELEASABLE LOCK SUPPORT FOR PRINTED CIRCUIT MODULE

BACKGROUND OF THE INVENTION

1. Field of the Invention

This invention is in the field of fasteners of the type in which two members are locked together by positioning a lock support through suitably aligned apertures in the members, and then rotating the lock support to provide for releasably locked engagement between the members.

2. Description of the Prior Art

The present invention will be described in conjunction with the locking of a printed circuit board to a chassis in the production of printed circuit modules, but it will be understood that the invention is equally applicable to the joining of other types of structural members.

In the past, printed circuit modules have been made up by joining printed circuit boards to a chassis with the use of conventional joining elements such as bolts, spacers, spring washers and the like. The use of such conventional elements requires significant time in assembly and additional manual fastening operations. To eliminate this hardware and the necessity for additional tools, the lock support of the present invention, in its preferred form, consists of a one piece element which has naturally resilient flange portions providing the function of a spring washer, and flexible gripping means which eliminate the necessity of providing nuts, bolts or rivets.

SUMMARY OF THE INVENTION

The present invention provides a releasable lock support which includes a central body portion, and a generally convex flexible flange member depending from the body portion and cooperating with a pair of spaced flexible leg portions. These leg portions each have a planar surface thereon arranged to engage the undersurface of the chassis when the leg portions are inwardly flexed by passage through an aperture in the chassis. The lock support also includes a generally concave flexible flange portion connected to an upper portion of the body portion, with a gripping portion which cooperates with the concave flexible flange portion to firmly engage the upper of the two members to be joined. Locking action is provided merely by rotating the gripping portion a partial revolution so that the planar surfaces provided on the gripping portion firmly engage the periphery of an elongated aperture which is provided in the upper member to be joined.

BRIEF DESCRIPTION OF THE DRAWING

Other objects, features and advantages of the invention will be readily apparent from the following description of a preferred embodiment thereof, taken in conjunction with the accompanying drawing, although variations and modifications may be effected without departing from the spirit and scope of the novel concepts of the disclosure, and in which.

DESCRIPTION OF THE PREFERRED EMBODIMENTS

Figure 1:
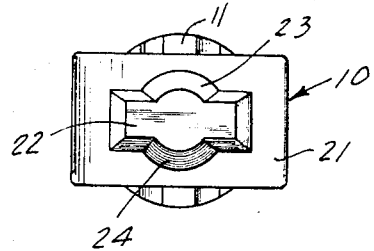
FIG. 1 is a plan view, on an enlarged scale, of the lock support of the present invention.

In FIG. 1, reference numeral 10 indicates generally a lock support member produced according to the present invention. Preferably, the entire member 10 is an integral structure which has been injection molded from a suitable insulating resin such as nylon. The lock support 10 includes a central body portion 11 from which a generally convex flange member 12 extends. A pair of grooves 13 and 14 are molded into the lock support between the body portion 11 and the flange portion 12 to provide for greater flexibility of the flange portion 12 with respect to the body portion 11.

Depending from the convex flange portion 12 are a pair of legs 15 and 16 of tapered configuration. Formed along the legs are a pair of shelf-like planar surfaces 17 and 18 of greater width than the remainder of the legs, which surfaces are arranged to resiliently engage the underside of the chassis, as will be apparent from a succeeding portion of this description.

Figure 2:
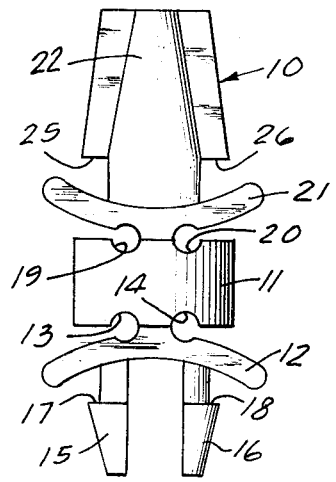
FIG. 2 is a front elevational view of the lock support shown in FIG. 1.
Figure 3:
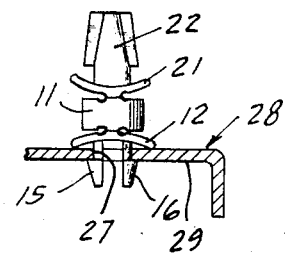
FIG. 3 is a view illustrating how the lock support engages the chassis in an initial portion of the assembly.
Figure 4:
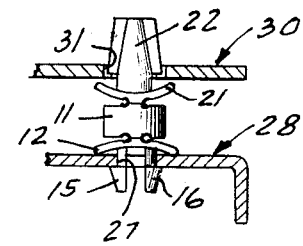
FIG. 4 is a view similar to FIG. 3 but showing the printed circuit board being placed over the lock support during assembly.

At the upper end of the body member 11 is a pair of grooves 19 and 20 which are provided to achieve increased flexibility for a concave shaped flange member 21 integral with the body portion 11. Extending from the concave shaped flange member 21 is a gripping member 22 having arcuate ribs 23 and 24 (FIG. 1) formed therein. The gripping portion 22 has a pair of shelf-like planar surfaces 25 and 26 spaced from the concave flange 21, as best illustrated in FIG. 2 of the drawing.

In assembling the module of the present invention, the lock support 10 is inserted through a circular aperture 27 located in a chassis 28. There will normally be an aperture at each corner of the printed circuit board, but only one is illustrated in the drawing. The diameter of the aperture 27 is somewhat less than the peripheral dimension of the legs 15 and 16 so that the legs 15 and 16 are slightly flexed as they pass through the aperture 27 whereupon they spring back into firm engggement with the undersurface 29 of the chassis 28, with the planar surfaces 17 and 18 of the leg portions 15 and 16 firmly engaging such undersurface. Furthermore, the distance between the convex shaped flange member 12 and the planar surfaces 17 and 18 is such that the engagement of such planar surfaces with the underside of the chassis causes the flange portion 12 to be slightly compressed and tightly received against the upper surface of the chassis 28 at the periphery of the aperture 27. The flange portion 12 thereby acts as a spring washer under a slight load.

Figure 5:
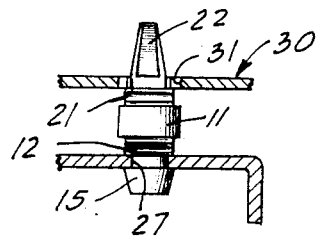
FIG. 5 is a side elevational view, partly in cross-section, of the elements in their locked position.
Figure 6:
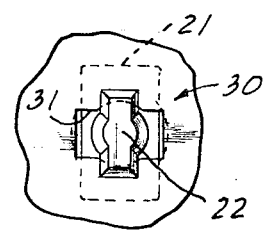
FIG. 6 is a plan view of the assembly after locking has occurred.

The next step in assembly consists in placing a printed circuit board 30 having an elongated, keyhole-type aperture 31 therein over the chassis 28 with the apertures 31 and 27 in axial alignment, the long dimension of the gripping portion 22 coinciding with the long dimension of the aperture 31. A slight pressure is then applied to the printed circuit board 30 so that it firmly engages the concave shaped flange portion 21, whereupon the gripping portion 22 is rotated a quarter turn or so to reach the position shown in FIGS. 5 and 6 of the drawing where the long dimension of the gripping portion 22 is perpendicular to the long dimension of the elongated slot 31. In this position, the concave flange portion 21 is depressed into firmly contacting relationship with the underside of the printed circuit board 30, to provide, in effect, another spring washer. The spacing between the concave flange portion 21 and the planar surfaces 25 and 26 is such that the thickness of the printed circuit board 30 is firmly received therebetween, and the concave flange portion 21 is firmly seated about the periphery of the aperture 31. The body portion 11 of the support acts as a spacer between the printed circuit board 30 and chassis 28.

From the foregoing, it will be seen that the releasable lock support of the present invention eliminates the need for assembling conventional hardware, and using fastening tools. The lock support can be inserted between the elements to be joined in a matter of seconds and provides excellent holding power, centering, and locking of the assembly under tension.

It will be evident that various modifications can be made to the described embodiments without departing from the scope of the present invention.

I claim as my invention:

1. A releasable lock support for releasably locking together two planar components comprising a one-piece element composed of a flexible insulation material, said element having a central body portion, a first dished flange member extending from said body portion and having convexly formed distal ends located below said central body portion, a pair of flexible leg members depending from said first dished flange member and having planar surfaces formed thereon arranged to engage the underside of one of the components to be joined, a second dished flange member extending from said body portion and having concavely formed distal ends located above said body portion, and a gripping member extending upwardly from said second dished flange member, said gripping member having a horizontal planar surface thereon spaced from said second dished flange member sufficiently to snugly engage the second of said components therebetween upon resilient deformation of said second dished flange member.

2. The lock support of claim 1 in which said gripping member has an inwardly tapered configuration extending upwardly from its planar horizontal surface.

* * * * *